Nov. 7, 1961 S. A. McCLELLAN 3,008,134
INDICATING INSTRUMENT FOR AIRCRAFT OR THE LIKE
Filed May 6, 1957 2 Sheets-Sheet 2

INVENTOR.
STEPHEN A. McCLELLAN
BY John C. McGregor
his attorney

United States Patent Office
3,008,134
Patented Nov. 7, 1961

3,008,134
INDICATING INSTRUMENT FOR AIRCRAFT
OR THE LIKE
Stephen A. McClellan, Glen Cove, N.Y., assignor to Specialties, Inc., Syosset, N.Y., a corporation of New York
Filed May 6, 1957, Ser. No. 657,411
5 Claims. (Cl. 340—324)

This invention relates to instruments and more particularly to instruments for indicating to the pilot or other personnel a characteristic of aircraft flight.

Conventionally, characteristics of aircraft flight are detected and the information presented in the form of dial readings on the instrument panel for the pilot to see, or in the form of signals for use in computing networks, switching devices and the like. One flight characteristic which can on particular occasions be invaluable in piloting aircraft is airstream direction. Measured in a vertical plane, it represents angle of attack, which can for example be absolutely critical in landing and in various maneuvers which could involve stall conditions.

Because angle of attack is a continuous variable of a quantitative nature, it is difficult information for a pilot fully occupied in a "contact" flight maneuver, that is flying by means of landmarks outside the aircraft, to pick up from his instrument panel. A pilot bringing his aircraft to a landing on a water-borne carrier, for example, cannot take his eyes from his elusive destination. Rather, he must depend to a very large degree on personnel on the carrier to wig-wag back to him information about his own approach flight, even though some of the information might be directly available to him on his own instrument panel.

It is therefore one object of the present invention to provide a system for conveying information as to a flight condition visually to the pilot of an aircraft in such a manner that he need not divert his vision from an objective outside of the aircraft.

It is another object of the invention to provide an indicating instrument for use in aircraft and the like which affords, by means of codified visual signals, a quantitative indication of a flight characteristic.

It is another object of the invention to provide a system for conveying flight information to both pilots and ground personnel in a manner which is efficient for both.

These and other features and objects of the present invention are attained by means of an instrument system based on detection of a variable such as airstream direction and including an information source, an information converter, and a visual indicator for conveying the converted information to a pilot. In order that the pilot not be required to divert his primary vision from objectives outside the aircraft, such, for example, as a landing space under approach, the information is so codified and presented to the pilot that it can be read in his secondary field of vision. To this end an array of correlated light sources are mounted to fall within the pilot's secondary field of vision as he looks out through the wind screen over one side of the airplane's nose, as he would in the case of a landing approach. In general, the light sources are mounted above and slightly ahead of one side of the instrument panel of the aircraft. The source information is examined by the converter and reduced to a predetermined number of gradations, which, in turn, selectively energize the light source array both indivdually and in combinations to create light patterns preceptible to the secondary field of vision of the pilot and capable of interpretation from that secondary field.

Approach lights mounted externally, as on the leading edge of a wing, can be energized from the same converter, the circuit preferably being arranged to energize the approach lights in a more simplified pattern adaptable for reading from a distance, as by ground personnel.

A representative embodiment of the invention from which the above and other features and objects of the invention will be readily understood is described below having reference to the accompanying drawings, in which.

Figure 1:
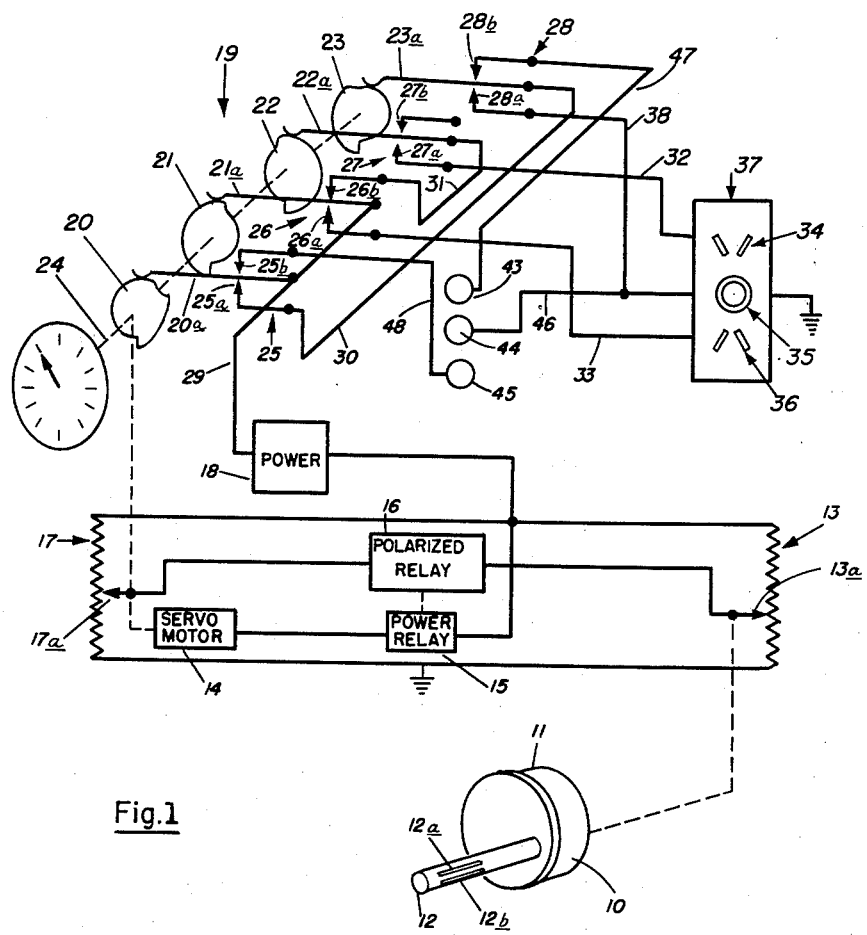
FIGURE 1 is a schematic diagram, partly isometric in layout, of an instrument system for conveying information from a source to the secondary field of vision of a pilot of an airplane and to an approved light system.

Referring to FIGURE 1, the invention is illustrated as embodied in an aircraft instrument system adapted to develop and convey to the pilot information concerning the direction of the airstream relative to a reference axis such, for example, as the axis of the airplane. The system includes an information or signal source 10 in the form of an airstream direction detector including a housing 11 adapted to be mounted in the fuselage of an airplane and, projecting therefrom, a probe rotatable on its axis. In those cases in which the system is used to detect the angle of attack of the airplane, the probe 12 projects horizontally into the airstream; to indicate sideslip it projects vertically. The action of the probe is such that it seeks an angular position with the parallel slots 12a and 12b facing the direction of the airstream, in balance on either side of the exact direction of the airstream. A representative unit of this type is disclosed in U.S. Patent No. 2,445,746.

The output from the source 10, in the form of motion of a slide tap or wiper 13a of a potentiometer 13, is reflected in the motion of a servo motor 14 under the control of a power relay 15 energized in turn by a polarized relay 16 connected between the slide tap 17a of a potentiometer 17, representing the receiver of the servo system, and the slide tap 13a. The potentiometer and the servo motor are energized by a suitable power source 18. The servo motor 14 drives, in addition to the slide tap 17a, a signal converting means indicated generally by the numeral 19 for changing the continuously variable output of the information source 10 to a finite number of signals each representative of a given range of values from the source. To this end the converting means 19 comprises cams 20, 21, 22 and 23 on a common shaft 24 driven by the servo motor 14. Followers 20a, 21a, 22a and 23a which represent the moving contact of single-pole, double-throw switches 25, 26, 27 and 28, ride on the respective cams 20, 21, 22 and 23. The switches 25, 26, 27 and 28 include, respectively, closed contacts 25a, 26a, 27a, and 28a normally engaged by the corresponding followers or movable contacts 20a, 21a, 22a and 23a and contacts 25b, 26b, 27b, and 28b normally out of engagement with the corresponding followers. The moving contacts or followers 20a and 21a are connected by a conductor 29 to the power source 18. The contact 25a is connected to the follower or movable contact 23a by a conductor 30, and the contact 26b is connected to the follower 22a by a conductor 31. The contacts 27a and 26a are connected by conductors 32 and 33 respectively to light sources 34 and 36 of an indicator 37 mounted in the secondary field of view of the pilot, as described below. The contact 28a is connected by a conductor 38 to a light source 35 of the indicator 37.

If desired, an array of approach lights 43, 44, and 45 located externally on the aircraft, preferably color coded and in a horizontal line, can be connected to be energized by the converting means 19 in a manner differing from the indicator 37. To this end, the center light 44 is connected by a conductor 46 to the conductor 38; the high angle of attack light 43 is connected by a conductor 47 to the contact 28b; and the low angle of attack light 45 is connected by a conductor 48 to the control 25b.

The design of the cams 20, 21, 22, and 23 is such that the three light sources 34, 35, and 36 can be energized individually and the light source pair 35—36 can be energized at the same time, as can the light source pair 35—34. With a selection of five different combinations, a light pattern is established in which the illumination of the light source 35 alone can be made to correspond to a predetermined optimum angle of attack for landing the aircraft. The range of angles, say 2 degrees, over which the central light source 35, which can be termed the bull's eye, is alone illuminated is determined by the dimensions of the lobes of the cams 20 and 23 and their angular setting on the drive shaft 24 of the servo motor 14. Similarly, the cams 21 and 22 control their corresponding switches to energize the light sources 34 and 36, respectively, over a range of values for the otuput of the signal or controlling source 10 in such fashion that with an extremely high angle of attack, representing a slow approach, the upper source 34 is alone illuminated. If desired, this signal can also be utilized to indicate the onset of stalling conditions. As the angle of attack decreases to a point only slightly high, the light source 35 comes on together with the source 34. The same illumination conditions occur as between the lower light source 36 and the bull's eye source, i.e., the lower source alone indicates too fast approach occasioned by a low angle of attack and illumination of the pair together signifies a slightly too small angle of attack. In this fashion light patterns occur which can be easily read and related to actual flying conditions. The approach lights 43, 44, and 45 are energized to present a different operational pattern. The center light 44 operates together with the corresponding light source 35 of the indicator 37. The high light 43 and the low light 45 are energized, however, only at the time the center lights are extinguished, this action deriving from the cams 20 and 23 and their corresponding switches 25 and 28. Thus, one set of control switches achieves two different, although related, light patterns, one designed for use by the pilot and the other by ground personnel.

For carrier based aircraft, a typical landing approach technique involves piloting the aircraft into the so-called "Roger band," which is the space projected upwardly at an angle from the carrier within which the particular aircraft involved can make a successful approach flight. The aircraft is then launched into its approach flight at its optimum angle of attack, which, as described above, is readily maintained by the pilot by reference to the light array of the indicator 37. Experience has shown that a 1° Roger band can be flown consistently on final approach.

Figure 2:
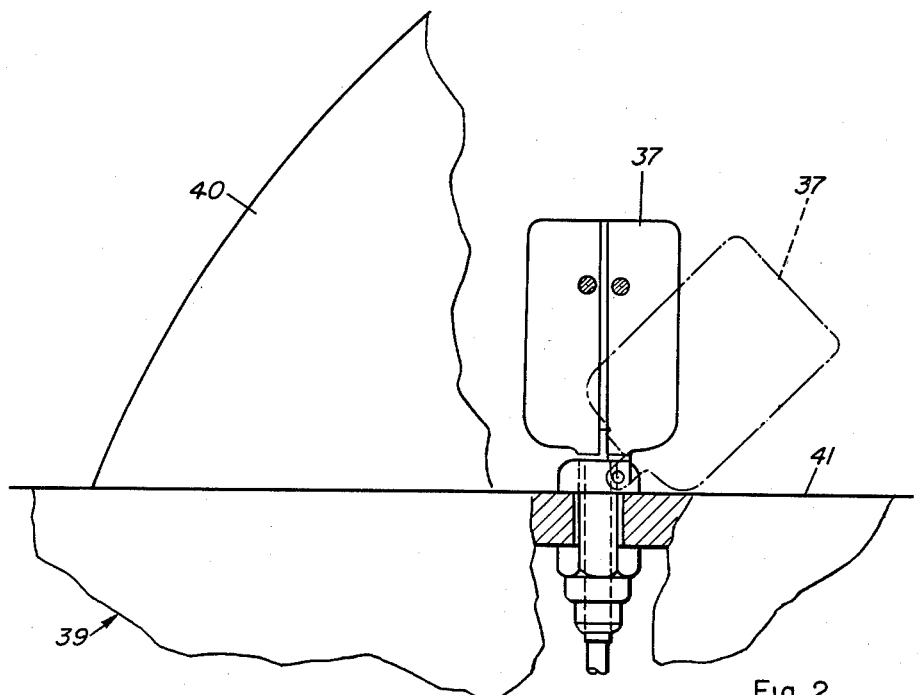
FIGURE 2 is a view, as seen from the pilot's seat, of a portion of the windscreen and the deck above the instrument panel of an aircraft and showing the face of the indicator in the field of secondary vision of the pilot.
Figure 3:
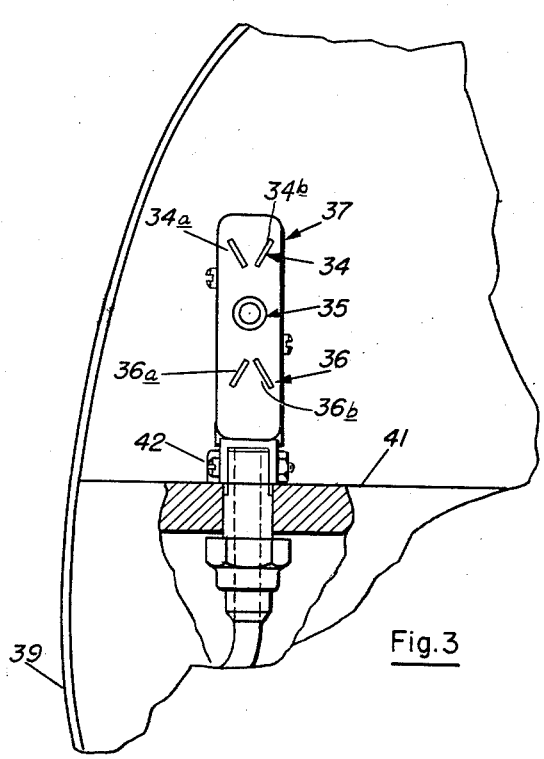
FIGURE 3 is a side view of the indicator of FIGURE 2 showing the indicator in a range of positions.
Figure 2A:
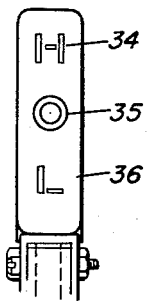
FIGURE 2A is a view in front elevation of an indicator having a modified face design.

The codification of the quantitative information as to airstream direction and the presentation of the information in illumination patterns, all as described above, are such that the information can be read in the secondary field of vision of a pilot fully occupied in contact flight while focussing his attention for example on the carrier landing area. The geometry of the illuminating indicator 37 and its mounting in an aircraft are best illustrated by FIGURES 2, 2A, and 3.

The indicator is mounted in the airplane 39 just above and slightly ahead of the lefthand side of the instrument panel (not shown), rearwardly of the wind screen 40. A preferred location for the indicator, for example, is the deck 41 which extends from the top of the instrument panel to the wind screen. The location of the indicator 37 is such that it is in the pilot's secondary field of vision as he looks out through the wind screen 40 over the lefthand side of the nose of the airplane, as he would when negotiating a landing approach. To accommodate possible slopes in the deck 41, the indicator is carried on a hinge or pivot assembly 42 so that the indicator can be disposed with its face on a vertical plane. One extreme of the range of pivotal motion is indicated in broken lines in FIGURE 3.

To render the light patterns in a manner in which they can be perceived in the secondary field of vision of the pilot, the central light source or bull's eye 35 takes the form of a circular light source and the two flanking sources 34 and 36 the form of light or illumination lines convergent towards the center source. The upper source 34, for example, comprises a pair of downwardly convergent light lines 34a and 34b and the lower source 36 a pair of upwardly convergent lines 36a and 36b. The combination on a dark background of the central light source and one of the flanking and directional sources, indicating one band of information, tells the pilot he is close to but slightly beyond the desired angle of attack. In the event the indicator 37 is to be used to indicate sideslip, crabwise flight or the like, the indicator can be disposed horizontally, in which position the flanking light sources or indicia 34 and 36 are likewise informative of the flight parameter under detection, that is to say, their design is such that they are indifferent to vertical or horizontal positioning. In certain cases, as might be desirable for purposes of preliminary training, the indicator face can be changed by utilizing the abbreviations H and L for high and low angles of attack, as shown in FIGURE 2A by the numerals 34' and 36'. If preferred, the letters S and F, signifying slow and fast approach can be used.

It will be understood that for any given installation, the instrument system is set, as by appropriate positionings of the cams in the signal converting means 19, so that the center light sources 35 and 44 are energized for the optimum angle of attack for the particular flight path desired. Thus, if the angle of attack setting is for the optimum landing approach, the center source will be illuminated, not at zero angle of attack, but at some angle above zero. It will be understood that the instrument system can take various forms and shapes within the scope of the present invention. For example, relays can be used in the circuitry to the indicator lights and approach lights in those cases in which high power is required. The invention should not, therefore, be regarded as limited except as defined in the following claims.

I claim:

1. In a system for conveying flight information to the pilot of an aircraft having a windscreen, including means to detect values representative of a desired flight condition and to present the information in the form of continuously variable signals, the invention comprising signal converter means to transpose the continuously variable signals to a finite number of at least five signals, each representing a given range of said values, each range having a portion of its signal values common to the next adjacent range and the remainder of its signal values exclusive of all other ranges, visual indicator means including an array of three aligned light sources disposed in a closely spaced series pattern, said pattern comprising a symmetrical central light source, indicative of true flight conditions, and, flanking the central source, a pair of identical, mirror-image sources, each of which comprises at least two lines symmetrical about the axis of alignment of the array and convergent toward the central source and toward each other, to indicate, both individually and in combination with the central source, a departure from true flight conditions, said convergent lines also being adapted to be positioned relative to the aircraft to be convergent in the direction toward which the pilot should correct the flight pattern to achieve truer flight conditions, means to connect the respective light sources to be energized, respectively, by signals, each representing one range from the converter means to energize two light sources concurrently during signal values common to two adjacent ranges of signal values and to energize one light source at all other times, said signal converter means being adapted to selectively energize any one of the three aligned light sources individually when the signal values are exclusively in one range and to energize either of the two adjacent pairs of light sources simultaneously during signal values common to two corresponding and adjacent ranges of values and means to mount the light source array in the secondary field of vision of the pilot as he looks through the windscreen, whereby the pilot can derive, from three coordinated light sources, information as to at least five ranges of flight conditions coupled with information indicating, in cases other than true flight conditions, the direction of movement required of the aircraft to achieve true flight conditions.

2. An instrument system as set forth in claim 1, said detecting means providing information indicative of angle of attack as represented by the angle in a vertical plane between the airstream and the axis of the aircraft, said light source array being arranged with the three light sources stacked in vertical series.

3. An instrument system as set forth in claim 1, including movable support means for said light source array to support the array selectively in a range of positions.

4. An instrument system as set forth in claim 1, including an array of approach lights to be viewed externally of the aircraft, said signal converting means including means to energize said approach lights concurrently with said light sources of the indicator.

5. An instrument system as set forth in claim 4, said means to energize the approach lights affording a finite number of signals each representing a given range of values, the ranges represented thereby being successive and non-overlapping.

References Cited in the file of this patent
UNITED STATES PATENTS

| | | |
|---|---|---|
| 2,114,283 | Anderson | Apr. 19, 1938 |
| 2,663,008 | McEwan | Dec. 15, 1953 |

OTHER REFERENCES

"Aviation Week," Aug. 18, 1952 (pp. 49–51 relied on).